United States Patent
Escott et al.

(10) Patent No.: US 8,788,807 B2
(45) Date of Patent: Jul. 22, 2014

(54) PRIVACY PROTECTION IN COMMUNICATION SYSTEMS

(75) Inventors: Adrian Escott, San Diego, CA (US); James Semple, London (GB)

(73) Assignee: QUALCOMM Incorporated, San Diego, CA (US)

( * ) Notice: Subject to any disclaimer, the term of this patent is extended or adjusted under 35 U.S.C. 154(b) by 863 days.

(21) Appl. No.: 11/621,916

(22) Filed: Jan. 10, 2007

(65) Prior Publication Data

US 2007/0168662 A1    Jul. 19, 2007

Related U.S. Application Data

(60) Provisional application No. 60/758,971, filed on Jan. 13, 2006, provisional application No. 60/762,771, filed on Jan. 27, 2006.

(51) Int. Cl.
*H04L 29/06* (2006.01)

(52) U.S. Cl.
USPC .......... 713/155; 713/160; 713/153; 713/171; 380/279; 380/277; 380/278; 380/281; 726/2; 709/225; 709/226; 709/229; 455/411; 719/314

(58) Field of Classification Search
CPC ... H04L 63/062; H04L 63/12; H04L 63/0414; H04L 9/083; H04L 9/32; H04L 9/0816; H04L 9/08; H04L 9/0838; H04L 9/0802; H04L 9/0861; H04L 2463/061
USPC .......... 713/155, 153, 160, 171; 709/225, 226, 709/229; 705/67; 455/411; 380/278, 281, 380/279, 277; 719/314; 726/2
See application file for complete search history.

(56) References Cited

U.S. PATENT DOCUMENTS

| | | | | |
|---|---|---|---|---|
| 5,740,361 | A * | 4/1998 | Brown | 726/5 |
| 6,807,277 | B1 * | 10/2004 | Doonan et al. | 380/281 |
| 6,850,979 | B1 | 2/2005 | Saulpaugh et al. | |
| 2004/0008846 | A1 * | 1/2004 | Medvinsky | 380/278 |
| 2004/0103066 | A1 | 5/2004 | Staddon et al. | |
| 2004/0222878 | A1 * | 11/2004 | Juels | 340/10.1 |
| 2005/0239440 | A1 * | 10/2005 | Chen et al. | 455/411 |
| 2006/0150196 | A1 * | 7/2006 | Herrmann | 719/314 |
| 2007/0101122 | A1 * | 5/2007 | Guo | 713/153 |
| 2008/0025337 | A1 | 1/2008 | Smith et al. | |

FOREIGN PATENT DOCUMENTS

| | | |
|---|---|---|
| CN | 1574756 A | 2/2005 |
| EP | 1480373 | 11/2004 |
| JP | 2004348709 A | 12/2004 |

(Continued)

OTHER PUBLICATIONS

Garman, J. (Dec. 2003).Kerberos: The definitive guide, 1st edition. O'Reilly Media, Inc.*

(Continued)

*Primary Examiner* — Brian Shaw
(74) *Attorney, Agent, or Firm* — Won Tae Kim

(57) ABSTRACT

Methods and apparatus for protecting user privacy in a shared key system. According to one aspect, a user generates a derived identity based on a key and a session variable, and sends the derived identity to an application. In one embodiment, a key server may be used to receive the derived identity from the application, and return a sub-key to the application to use for encrypting communications with the user.

17 Claims, 3 Drawing Sheets

(56) References Cited

FOREIGN PATENT DOCUMENTS

| | | |
|---|---|---|
| JP | 2005086428 A | 3/2005 |
| KR | 20040001374 | 1/2004 |
| RU | 2150790 | 6/2000 |
| RU | 2175465 | 10/2001 |
| RU | 2259639 | 8/2005 |
| TW | 200302652 | 8/2003 |
| WO | 09934551 | 7/1999 |
| WO | WO2005036857 | 4/2005 |

OTHER PUBLICATIONS

Gong, L.(Jun. 1993). Variations on the themes of message freshness and replay. In Proceedings of the Computer Security Foundations Workshop VI, Franconia, New-Hampshire.*

Needham, R.M & Schroeder, M.D.(Dec. 1978). Using encryption for authentication in large networks of computers. Communications of the ACM, 21(12), 993-999.*

Network Working Group (1999). Request for Comments: 2617. Retrieved from http://www.ietf.org/rfc/rfc2617.txt.*

GBA(Dec. 8, 2005). Generic Bootstrapping Architecture (GBA) Framework: 3GPP2 S.P0109-0 Version 0.6. Retrieved Nov. 17, 2011 from http://ftp.3gpp2.org/TSGS/Working/_2005/2005-12-Maui/WG%204%20Security/S40-20051205-020r2_Editor_S.P0109v0.6_baseline.doc.*

3GPP TS 33.220, "Generic Authentication Architecture (GAA): Generic Bootstrapping Architecture" version 6.11.0 (Dec. 2006).

3GPP2 S.S0109-0 Version 1, "Generic Bootstrapping Architecture (GBA) Framework", Mar. 30, 2006.

Secure Hash Algorithm (SHA-1), Federal Information Processing Standards Publication 180-1, Apr. 17, 1995.

International Search Report—PCT/US07/060519, International Search Authority—European Patent Office, Jul. 3, 2007.

B. Schneier, "Applied Cryptography: protocols, algorithms, and source code in C", published in Russian by "Triumf", 2002, section 18.3.

Written Opinion—PCT/US2007/060519, International Search Authority, European Patent Office, Jul. 3, 2007.

Ryu Watanabe, Ayumi Kubota and Toshiaki Tanaka, "A Practical Pseudonym Management Scheme under Single Sign-on Environment," The Institute of Electronics, Information and Communication Engineers, Society Conference, Transactions, 2005, 2005—Communications (2), p. s-32.

* cited by examiner

PRIVACY PROTECTION IN COMMUNICATION SYSTEMS

CLAIM OF PRIORITY UNDER 35 U.S.C. §119

The present Application for Patent claims priority to Provisional Application Ser. No. 60/758,971, filed Jan. 13, 2006, and Provisional Application Ser. No. 60/762,771, filed Jan. 27, 2006, both assigned to the assignee hereof, and the entire disclosures of which are hereby expressly incorporated by reference herein.

BACKGROUND

1. Field

The present invention generally relates to communications, and more particularly, to protecting a user's privacy in communication systems.

2. Background

As modern devices become capable of communicating with arbitrary application servers, there is a need for such communications to be authenticated and secured. In asymmetric or public key systems, the device (or "user") may present a public key to an application server (or "application"), while keeping a separate private key confidential. In shared or symmetric key systems, the user may conduct communications with an application using a user identity, which might be "anonymous" in that the user identity may not reveal who the user actually is. Upon receiving this user identity, the application can then obtain a key linked to that user identity to engage in encrypted communications with the user. The key may be one previously known to the application, or it may be fetched from a key server, e.g., a third party that is trusted by both the user and the application.

There are certain ways in which user privacy might be compromised in these systems, even when an "anonymous" user identity is used. For example, if a user exchanges the same user identity with an application over multiple sessions, the application might infer private information about the user by linking the user's sessions to each other. This is referred to as a "linkability attack." For example, in a wireless network, using one identity to access several base stations could lead to a user being tracked across the network. Alternatively, if a user accesses several different applications using the same user identity, then a third party might ascertain which applications the user has accessed, and when the user has accessed them, by passively eavesdropping on the communication of user identity between the application and the key server. This potentially reveals private information about the user's preferences. The same information might be obtained by a third party directly querying the accessed applications.

SUMMARY

One aspect of the present invention provides a method for protecting user privacy comprising generating a derived identity associated with a user based on a key and at least one parameter comprising a session variable; and sending said derived identity to an application.

Another aspect of the present invention provides a method for protecting user privacy during communications in a system having a key server, said method comprising receiving from a user a derived identity generated from a key and at least one parameter comprising a session variable; transmitting said derived identity to said key server; and receiving from said key server information associated with said user.

Yet another aspect of the present invention provides a method for protecting user privacy comprising receiving, from a user, a derived key identity generated from a key and at least one parameter comprising a session variable; and identifying said key from said derived key identity.

Yet another aspect of the present invention provides a method for protecting user privacy during communications in a system having a key server, said method comprising receiving from a requesting application a derived identity generated from a key and at least one parameter comprising a session variable; and identifying said user from said derived identity.

Yet another aspect of the present invention provides an apparatus for protecting user privacy comprising a derived identity generator for generating a derived identity associated with a user based on a key and at least one parameter comprising a session variable; a transmitter for sending said derived identity to an application.

Yet another aspect of the present invention provides an apparatus for protecting user privacy during communications in a system having a key server, said apparatus comprising a receiver for receiving from a user a derived identity generated from a key and at least one parameter comprising a session variable; and a transmitter for transmitting said derived user identity to said key server.

Yet another aspect of the present invention provides an apparatus for protecting user privacy comprising a receiver for receiving, from a user, a derived key identity generated from a key and at least one parameter comprising a session variable; a processor for identifying said key from said derived key identity.

Yet another aspect of the present invention provides An apparatus for protecting user privacy during communications in a system having a key server, said apparatus comprising a receiver for receiving from a requesting application a derived identity generated from a key and at least one parameter comprising a session variable; and a processor for identifying said user from said derived identity.

Yet another aspect of the present invention provides an apparatus for protecting user privacy during communications with an application, said apparatus comprising a means for generating a derived identity; a means for sending said derived identity to an application.

Yet another aspect of the present invention provides an apparatus for protecting user privacy during communications in a system having a key server, said apparatus comprising a receiver for receiving from a requesting application a derived identity generated from a key and at least one parameter comprising a session variable; a means for identifying said user from said derived identity; and a transmitter for transmitting information associated with said user to said requesting application.

DETAILED DESCRIPTION

To protect user privacy, there is a need for providing secure communications between a user and an application, without revealing the actual identity of the user to the application or to a third party eavesdropping on the communication, or otherwise allowing the application to determine that different sessions originate from the same user. The invention disclosed herein addresses this need.

Figure 1:
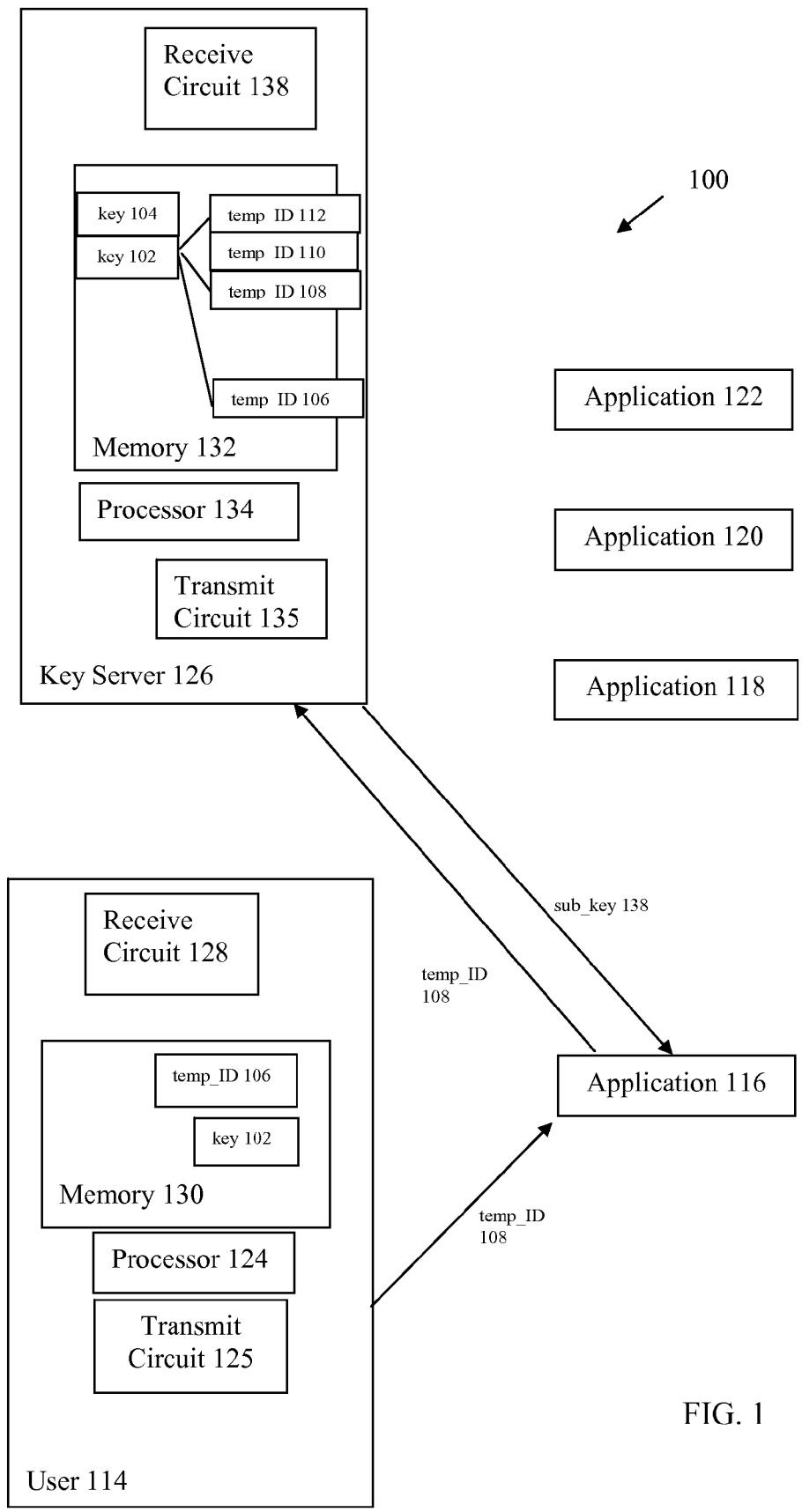
FIG. 1 shows an embodiment of the present invention in which a key server is used to facilitate encrypted communications between a user and an application.

Reference is now directed to FIG. 1, which shows an embodiment of a communication system 100 wherein a key server is used to facilitate encrypted communications between a user and an application.

The communication system 100 can be any voice, data or multimedia system, for example, operating under a communications standard and/or protocol, such as the WCDMA (Wideband Code Division Multiple Access), cdma2000, or IP (Internet Protocol) standard, or any other suitable standard or protocol. The embodiment may be utilized, for example, as an enhancement to the Generic Bootstrapping Architecture as specified in various communications standards. (See, e.g., "Generic Authentication Architecture (GAA): Generic bootstrapping architecture," 3GPP TS 33.220, and "Generic Bootstrapping Architecture (GBA) Framework," 3GPP2 S.S0109-0 Version 1.)

As illustrated in FIG. 1, a user 114 (also referred to as a user equipment) may access an application 116 in the system 100. The application 116 may be a dedicated server in the network serving a specific application, e.g., VoIP (Voice over Internet Protocol), or a network element itself. The application 116 may also be a software application stored in servers or other devices on the network. In an embodiment (not shown), the application 116 could reside on the same physical device as a key server 126. Each application may have its own dedicated transmitter/receiver circuit (not shown) for communicating with the user 114 and/or the key server 126, or several applications may share a common transmitter/receiver circuit. It may be noted that an application may include several physical entities, e.g., the application may be an entire mobile network comprising multiple base stations.

In one embodiment, the user 114 may pre-store a key 102 in its memory.

Both the key 102, and the fact that it is stored in user 114, are known to the key server 126. The key 102 may be unique to user 114, or to a group of users that includes user 114. The key 102 may be used permanently, or only during a specific time period. In an embodiment, the key 102 is known only to authorized parties such as the key server 126 and the user 114.

In one embodiment, both the user 114 and the key server 126 can generate a temp_ID 108 (also referred to as a derived identity) using a common formula, as follows:

$$\text{temp\_id} = F(\text{key}, m) \qquad \text{Eq (1)}$$

In Eq (1), F is a predetermined algorithmic function such as a cryptographic hash function. Alternatively, F can be a function that serially concatenates one or more parameters with the output of one or more hash functions. F can also be a function that performs a hash on the combination of a number of parameters with the output of one or more other hash functions. In an embodiment, the predetermined algorithmic function can be the Secure Hash Algorithm SHA-1. (See Federal Information Processing Standard Publication 180-1 (1995).)

Also in Equation (1), m denotes a parameter set which may include, for example, a user identity, one or more session-dependent variables, and/or other parameters. A session may denote a set of communications between a user and an application in which the same temp_ID is used. In an embodiment, m generally includes at least one session variable that may change each time a temp_ID is exchanged with an application. Such a variable may be a digitally incremented use counter, a time stamp, or output of a pseudorandom number generator. It will be understood that larger session variables may be used for greater security, at the cost of greater implementational complexity. In an embodiment, the session variable can be a 16-bit counter value.

Referring again to FIG. 1, both F and m are known to the user 114 and key server 126. In one embodiment, the key server 126 may pre-calculate and store the values of temp_ID based on a given key 102 and all possible values of the parameter m, so that, given a temp_ID, the key 102 used to generate it may be quickly identified.

Figure 2:
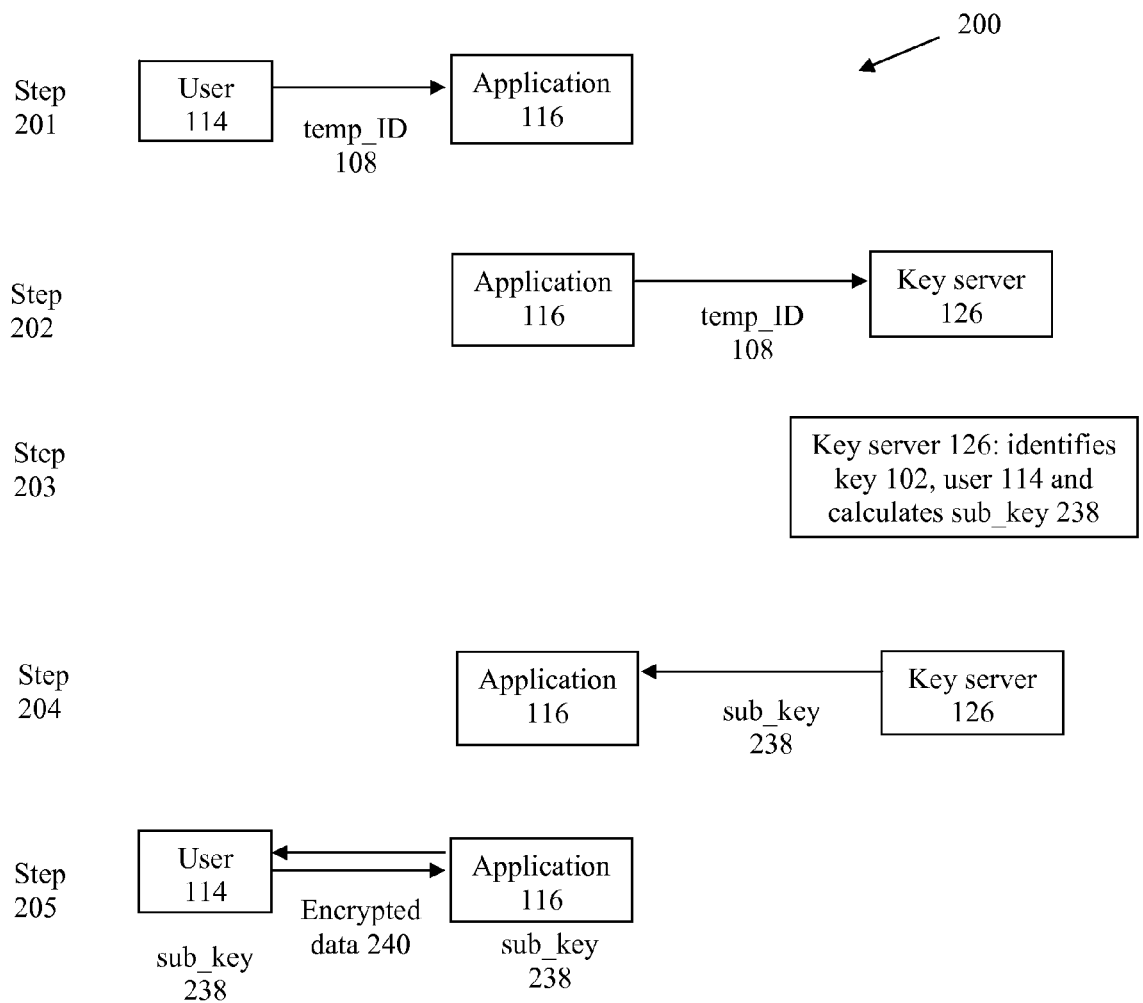
FIG. 2 illustrates an embodiment of a process or method in which the user may establish secure communications with an application according to the embodiment shown in FIG. 1.

FIG. 2 illustrates an embodiment of a process or method 200 in which user 114 may establish secure communications with application 116 according to the embodiment shown in FIG. 1. First, in step 201, user 114 calculates temp_ID 108 from the key and the parameter set m, and sends the temp_ID 108 to the application 116.

In step 202, once it has received the temp_ID 108 sent by user 114, application 116 sends the temp_ID 108 to the key server 126.

As described earlier, in one embodiment, the key server 126 has pre-stored a set of temp_IDs and keys in its memory. In step 203, the key server 126 uses the temp_ID 108 received from the application 116 to identify key 102. As mentioned previously, each key can correspond to a unique user. In this example, key 102 corresponds to user 114. The key server 126 can therefore match temp_ID 108 with user 114, as shown in step 203.

In step 203, the key server 126 may further generate a sub_key 238 (also called traffic key herein) based on key 102. This generation of a sub-key may use another algorithmic function and involve parameters known only to the user 114 and key server 126. In one embodiment, the value of temp_ID 108 itself may be used in generating the associated sub-keys. In an alternative embodiment, any number of sub-keys 238 can be generated by taking a hash function (e.g., SHA-1) of the key 102 and an appropriate sequence number.

In step 204, the key server 126 sends the sub_key 238 to the application 116. The key server 126 may also send other information about the user 114 to the application 116.

The user 114 can independently generate sub_key 238 (or "traffic key") from parameters already known to it. Thus, with the sub_key 238 known to both the application 116 and the user 114, both sides can use the sub_key 238 to encrypt and decrypt data 240 sent between them, as depicted in step 205.

Referring back to FIG. 1, if the user 114 subsequently accesses another application 122, a temp_ID other than the temp_ID 108 may be calculated in accordance with Eq (1) as described above. If the function F is chosen so that the relationship between temp_ID 108 and other temp_IDs used during different sessions by the same user is not readily discernible, it would be difficult for an unauthorized party to link an intercepted temp_ID with any particular user, thus preserving the user's identity privacy.

In one embodiment, the parameter set m used to generate temp_ID in Eq (1) may include an application identity (app_ID) corresponding to the accessed application. In this way, a key server 126 can tell from the temp_ID 108 whether application 116 requesting user information from the key server 126 has in fact been accessed by the user 114. For security, the key server 126 may choose to send information about the user 114, including the user identity and the user-specific key, only to an application 116 whose app_ID matches the app_ID used to generate temp_ID 108. This prevents another application such as application 118, which has not been accessed by the user 114, from obtaining information about user 114 from the key server 126.

In an embodiment, a user 114 may even be called upon to generate a temp_ID when the user 114 does not yet know the app_ID of the application it wishes to access. In this case, the user may nevertheless generate a temp_ID by using a fixed "wildcard" or "default" app_ID in place of an application-specific app_ID. In this embodiment, the key server can be configured to recognize a temp_ID containing such a "wildcard" or "default" app_ID, and provide user-specific data to an application even though the wildcard app_ID does not match the app_ID of the requesting application. At a later time, once the user has ascertained the application's app_ID, the user may generate a new temp_ID based on the correct app_ID.

In another embodiment of the invention, if a new parameter set m' is agreed upon by the user and the application during a session, then, by querying a key server, an application could determine a new temp_ID to be used during a subsequent session. To do this, the application could provide, for example, the new parameter set m', along with the temp_ID initially received from the user, to the key server. This saves the user from having to transmit a new temp_ID to the application every time use of a new temp_ID is desired.

Figure 3:
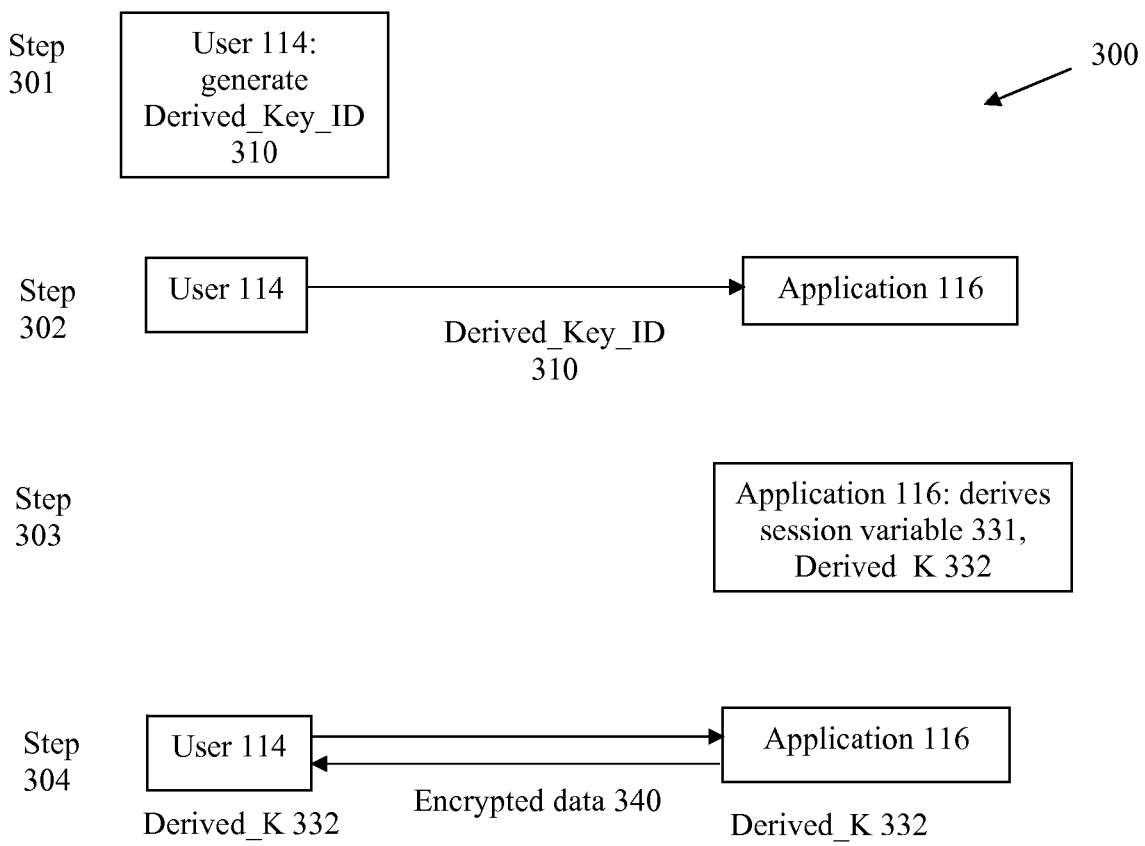
FIG. 3 shows an embodiment of a process or method in which the user can securely communicate with an application, without using a key server.

FIG. 3 shows an embodiment of a process or method 300 in which the user 114 can securely communicate with an application 116, without using a key server.

In this embodiment, it is assumed that the user 114 and application 116 already share a key K through some key distribution scheme, prior to initiating the communications depicted in FIG. 3. In an embodiment, the key K is a variable known only to authorized parties such as the user and the application.

In step 301, user 114 can generate a Derived Key_ID 310 as follows:

$$\text{Derived\_Key\_ID} = F(K, \text{session variable, other parameters}) \quad \text{Eq (2)}$$

where F is again a predetermined algorithmic function, session variable is a session-dependent variable such as a counter value, and other parameters may include any parameter not explicitly enumerated herein that is known to both the user 114 and the application 116. As previously noted, a session variable may change each time a temp_ID is exchanged with an application, and may be a digitally incremented use counter, a time stamp, or output of a pseudorandom number generator. It will be understood that larger session variables may be used for greater security, at the cost of greater implementational complexity. In an embodiment, the session variable can be a 16-bit counter value.

In step 302, user 114 sends the Derived_Key_ID 310 to the application 116. In step 303, application 116, which has pre-calculated the set of Derived_Key_ID's over all possible values of key K, session variable, and other parameters and stored this set in memory, can identify the key K, session variable used to generate the received Derived_Key_ID 310, and the associated user 114. With both sides knowing the values of K, session variable 331, and other parameters, both sides can calculate a common key Derived_K 332 as follows:

$$\text{Derived\_K} = G(K, \text{session variable, other parameters}) \quad \text{Eq (3)}$$

where G is another predetermined algorithmic function and session variable 331 corresponds to the session variable used to generate Derived_key_ID 310 in Equation (2). It may be noted the function G may be chosen to be the same as that used to generate the sub_key 238 earlier described with reference to FIG. 2. Secure communications can now be conducted using the Derived_K 332 to send and receive encrypted data 340, as shown in step 304.

In a further embodiment of the invention, if a new parameter set m' is agreed upon by the user and the application during a session, then the application could determine, using Eq (3), a new_temp ID to be used by the user during a subsequent session. This would provide protection against linkability attacks by a third-party. For example, a user could vary its temp_ID's during sessions with different base stations in a mobile network to avoid being tracked by a third-party eavesdropper.

It may be noted that while the above embodiments have been described in the context of shared-key or symmetric cryptographic systems, public-key or asymmetric cryptographic systems are also susceptible to linkability attacks where a user repeatedly uses the same public key. Aspects of the present invention may also be applied to vary the private key, and hence the public key, according to a session-dependent variable and/or application identity. It may be noted however that in public key systems, the overhead of registration and certificate issuance processes required each time a public/private key pair is changed may lead to the same public/private key pair preferably being used over an extended period of time.

According to an embodiment, the memory in each of the key server 126 and the user 114 can be of either the volatile or non-volatile type, such as a magnetic hard drive or a RAM (Random Access Memory) circuit. As an alternative, the memory can also be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

It should be noted the invention can be embodied as a process or method and be coded as computer-readable instructions carried on any computer-readable medium known in the art. Here, the term "computer-readable medium" refers to any medium that participates in providing instructions to any processor, such as the processors in the key server 126 and the user 114 shown in FIG. 1. Such a medium can be of the storage type and may take the form of a volatile or non-volatile storage medium as also described previously, for example, in the description of the memory in the key server 126 and the user 114. Such a medium can also be of the transmission type and may include a coaxial cable, a copper wire, an optical cable, and the air interface carrying acoustic or electromagnetic waves capable of carrying signals readable by machines or computers.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein. While exemplary embodiments have been described, it will be understood by those skilled in the art that these and other changes in form and detail may be made therein without departing from the scope and spirit of the invention.

The invention claimed is:

1. A method for protecting user privacy comprising:
   receiving, from a user, at a key server, a first derived identity generated from a key stored at a user's device and at least one first session parameter comprising an application identity and a first session variable associated with a first session, wherein the at least one first session parameter is not received by the key server;
   identifying said key based upon said first derived identity at the key server, wherein said key and said first derived identity are pre-stored at the key server with a plurality of different keys, different first derived identifiers, and possible values of the at least one first session parameter;
   generating a first traffic key based upon said first derived identity at the key server if the application identity and the key have the same value as a corresponding application identity and key stored at the key server; and
   sending the first traffic key to an application to enable encrypted communication.

2. The method of claim 1, wherein said first session variable comprises a counter value.

3. The method of claim 1, wherein said first session variable comprises a time stamp.

4. The method of claim 1, wherein said first session variable comprises the output of a pseudorandom number generator.

5. A key server for protecting user privacy comprising:
   a receiver for receiving, from a user, a first derived identity generated from a key stored at a user's device and at least one first session parameter comprising an application identity and a first session variable and a second derived identity generated from the key and at least one second session parameter comprising an application identity and a second session variable, wherein the at least one first session parameter and the at least one second session parameter are not received by the key server;
   a processor for identifying said key based upon said first derived identity and from said second derived identity, wherein said key and said first and second derived key identity are pre-stored at the key server with a plurality of different keys, different first and second derived identifiers, and possible values of the at least one first session parameter and possible values of the at least one second session parameter;
   a generator for generating a first traffic key based upon said first derived identity, if the application identity of the at least one first session parameter and the key have the same value as a corresponding application identity and key stored at the key server, and for generating a second traffic key with said second derived identity, if the application identity of the at least one second session parameter and the key have the same value as a corresponding application identity and key stored at the key server; and
   a transmitter to send the first traffic key and the second traffic key to an application to enable encrypted communication.

6. The key server of claim 5, wherein said first session variable comprises a counter value.

7. The key server of claim 5, wherein said first session variable comprises a time stamp.

8. The key server of claim 5, wherein said first session variable comprises the output of a pseudorandom number generator.

9. A non-transitory computer readable medium having instructions stored thereon, the stored instructions, when executed by a processor, cause the processor to perform a method comprising:
   receiving, from a user, at a key server, a first derived identity generated from a key stored at a user's device and at least one first session parameter comprising an application identity and a first session variable associated with a first session, wherein the at least one first session parameter is not received by the key server;
   identifying said key based upon said first derived identity at the key server, wherein said key and said first derived identity are pre-stored at the key server with a plurality of different keys, different first derived identifiers, and possible values of the at least one first session parameter;
   generating a first traffic key based upon said first derived identity at the key server if the application identity and the key have the same value as a corresponding application identity and key stored at the key server; and
   sending the first traffic key to an application to enable encrypted communication.

10. The non-transitory computer readable medium of claim 9, wherein said first session variable comprises a counter value.

11. The non-transitory computer readable medium of claim 9, wherein said first session variable comprises a time stamp.

12. The non-transitory computer readable medium of claim 9, wherein said first session variable comprises the output of a pseudorandom number generator.

13. A key server for protecting user privacy comprising:
a receiver for receiving, from a user, a first derived identity generated from a key stored a user's device and at least one first session parameter comprising an application identity and a first session variable, wherein the at least one first session parameter is not received by the key server;
a processor for identifying said key based upon said first derived identity, wherein said key and said first derived key identity are pre-stored at the key server with a plurality of different keys, different first derived identifiers, and possible values of the at least one first session parameter;
a generator for generating a first traffic key based upon said first derived identity, if the application identity and the key have the same value as a corresponding application identity and key stored at the key server; and
a transmitter to send the first traffic key to an application to enable encrypted communication.

14. The key server of claim 13, wherein said first session variable comprises a counter value.

15. The key server of claim 13, wherein said first session variable comprises a time stamp.

16. The key server of claim 13, wherein said first session variable comprises the output of a pseudorandom number generator.

17. A key server for protecting user privacy comprising:
means for receiving, from a user, a first derived identity generated from a key stored a user's device and at least one first session parameter comprising an application identity and a first session variable, wherein the at least one first session parameter is not received by the key server;
means for identifying said key based upon said first derived identity, wherein said key and said first derived key identity are pre-stored at the key server with a plurality of different keys, different first derived identifiers, and possible values of the at least one first session parameter;
means for generating a first traffic key based upon said first derived identity, if the application identity and the key have the same value as a corresponding application identity and key stored at the key server; and means for sending the first traffic key to an application to enable encrypted communication.

* * * * *